United States Patent [19]

Burd et al.

[11] Patent Number: 5,473,771
[45] Date of Patent: Dec. 5, 1995

[54] FAULT-TOLERANT PROCESSING SYSTEM ARCHITECTURE

[75] Inventors: Margaret A. Burd, Thornton; Benny J. Ellis, Westminster; Jennifer T. Fitzgerald, Thornton; Barbara P. Havens, Broomfield; Jeremy R. Hutt, Denver; Janice A. Jones, Westminster; Timothy J. Lefoley, Louisville; Gary J. Mayer, Boulder, all of Colo.

[73] Assignee: AT&T Corp., Murray Hill, N.J.

[21] Appl. No.: 115,499

[22] Filed: Sep. 1, 1993

[51] Int. Cl.⁶ ........................... G06F 11/34; G06F 11/16; G06F 11/20

[52] U.S. Cl. ............... 395/182.02; 395/500; 395/200.19; 395/182.1; 395/182.09; 371/68.1; 371/68.2; 364/268.3; 364/268.9; 364/228.5

[58] Field of Search ..................................... 395/575, 400, 395/425, 325, 700; 371/7, 8.1, 8.2, 9.1, 10.1, 10.2, 10.3, 11.1, 11.2, 11.3, 68.1, 68.2, 68.3, 69.1; 364/228.5, 238.2, 240.2, 240.4, 268.9, 268.3

[56] References Cited

U.S. PATENT DOCUMENTS

| | | | |
|---|---|---|---|
| 4,610,013 | 9/1986 | Long et al. | 371/9 |
| 4,823,256 | 4/1989 | Bishop et al. | 364/200 |
| 4,907,228 | 3/1990 | Bruckert et al. | 371/68.3 |
| 4,933,940 | 6/1990 | Walter et al. | 371/9.1 |
| 4,959,854 | 9/1990 | Cave et al. | 379/157 |
| 4,972,415 | 11/1990 | Walter et al. | 371/35 |
| 5,079,740 | 1/1992 | Patel et al. | 364/900 |
| 5,086,499 | 2/1992 | Mutone | 364/200 |
| 5,142,470 | 8/1992 | Bristow et al. | 364/184 |
| 5,157,663 | 10/1992 | Major et al. | 371/9.1 |
| 5,283,868 | 2/1994 | Baker et al. | 395/500 |
| 5,287,492 | 2/1994 | Reynders | 395/575 |
| 5,325,517 | 6/1994 | Baker et al. | 395/575 |

FOREIGN PATENT DOCUMENTS

| | | | |
|---|---|---|---|
| 2051741 | 9/1990 | Canada | G06F 13/20 |
| 4343538 | 11/1992 | Japan | H04L 1/22 |
| 4319836 | 11/1992 | Japan | H04L 12/56 |

Primary Examiner—Robert W. Beausoliel, Jr.
Assistant Examiner—Dieu-Minh Le
Attorney, Agent, or Firm—David Volejnicek

[57] ABSTRACT

A fault-tolerant call-processing adjunct processor comprises a redundant, duplicated, service unit provisioning and maintenance processor), a duplicated LAN connected to both service units, and plurality of served units (voice-processing processors) each connected to both LANs. Each service unit and each served unit has a duplicate copy of mission-critical information (customer records and commands). Both service units are continuously exercised by operating in an active-active configuration. The service units alternate the use of the LANs, thereby continuously exercising both LANs and providing independent duplicate sources of the mission-critical information to the served units. All sending units rely on having their mission-critical communications timely acknowledged by all receiving units. Served units retry with the other service unit those communications that failed with a preferred service unit. All units store failed communications for subsequent retry. Served units either send communications (alarms) to both service units, or rely on service units to exchange communications (call measurements) received from the served units, to ensure that both service units are in possession of the same information.

32 Claims, 8 Drawing Sheets

FAULT-TOLERANT PROCESSING SYSTEM ARCHITECTURE

TECHNICAL FIELD

This invention relates generally to fault-tolerant processing-system architectures, and relates specifically to such architectures that employ redundancy.

BACKGROUND OF THE INVENTION

Ever-increasing demands being placed on the processing capabilities of processing systems have often exceeded the computing capacity of a single central processor. A solution to this problem has been to attach one or more auxiliary, or adjunct, processors to the central processor in such systems. The function of the adjunct processor has been to take some of the computational load off of the central processor, and thus increase the overall system processing capacity.

Certain applications of processing systems, such as communications switching, cannot easily tolerate being put out of service by the failure of system units. Such applications require the use of highly-reliable processing systems. Reliability in such systems has been achieved by the duplication of system units, in particular, the processors. Generally, the duplicated processors in such systems operate either in a lock-step configuration, with each processor performing all system tasks in parallel with the other processor, or in an active-standby configuration wherein one processor is performing all system tasks while the second processor is acting as a backup and is standing idly by, ready to take over should the one processor fail, or in a checkpoint configuration wherein a processor periodically sends information about transactions that it undertakes to another processor so that if failure of the one processor were to occur, the other processor could compute the current state of the failed processor and take over its transactions from that point. These arrangements are known as redundancy arrangements.

In redundant systems, either one of the duplicated processors is adapted to handle all systems tasks alone. Thus, a fault in one of the processors does not bring about the failure of the processing system. The other processor carries on all system tasks, but without a backup, until the faulty processor is repaired. In such systems, it takes the simultaneous failure of both processors to incapacitate the system. System reliability is thus significantly improved, but at the cost of adding a second processor that effectively goes unused. Furthermore, the viability of the second processor to take over the processing of system tasks can be guaranteed on a continuing basis only through extensive, complex, and expensive monitoring arrangements.

Multi-processor systems have also become extensively used. Such systems include a plurality of processors operating independently of each other, and hence not wasting the processing power of any of the processors. The processors are commonly attached to a communication bus, the use of which they share and over which they communicate both with each other and with shared resources such as memory. When one of the processors fails, the other processors take on the failed processor's processing load and continue to carry on all system tasks. Nevertheless, it has been difficult to make such systems highly reliable, one reason being that all of the processors share, and hence all depend upon the proper functioning of, the shared resources, such as communications buses and memory. And because a plurality of the processors share the resource, there is an increased chance that one of the processors will malfunction and adversely affect the shared resource, thereby adversely affecting as well the operation of the other processors that depend upon that resource.

Attempts have been made to combine the desirable features of both redundant processor and multi-processor architectures in one architecture. An example thereof is disclosed in U.S. Pat. No. 4,823,256. It discloses a dual processor system that can be configured, and reconfigured at will, to operate either as a multi-processor where both processors operate independently of each other, or as a redundant processor operating in the active-standby redundancy mode. However, the complexity of its disclosed implementation makes it too expensive and commercially impractical in all but a few specialized applications.

What the art still lacks is a fault-tolerant processing system architecture that is simple in design and inexpensive to implement, use, and maintain, yet that does not sacrifice robustness, reliability, and fault-tolerance.

SUMMARY OF THE INVENTION

This invention is directed to solving these and other problems and disadvantages of the prior art. According to the invention, there is provided a redundancy apparatus, and a method of operating that apparatus, which comprises a pair of redundant service units, a pair of communication media both connected to each service unit, and a plurality of served units each one of which is connected to both communication media. This apparatus may be, for example, a call-processing adjunct processor, wherein the service units are a duplicated provisioning and maintenance or administration and maintenance processing unit, the served units are call processing units, and the media are a duplicated LAN. The redundancy apparatus receives information for the served units, for example, from an external source of such information, and each service unit responds to the receipt by communicating the information individually to each served unit. Each service unit alternately uses a different one of the communication media to communicate the information to successive ones of the served units. Each served unit responds to receipt of the information from one service unit by using, e.g., storing, the information received from the one service unit, and responds to receipt of the information from the other service unit by discarding the information received from the other service unit.

The arrangement characterized above is very robust/fault tolerant, yet cost-effective to implement. While it relies for fault-tolerance on duplication of the service units and communication media, it operates both service units in the active mode (as opposed to the active-standby mode) and uses both media. Since both service units are active and both media are being used, there is no need for the special monitoring equipment and procedures that are needed to ensure the continued viability of an idle unit or medium; rather, both service units and both media are being exercised on a continuing basis, and the failure of either one of the service units or media becomes evident during normal operation. Since there is only one state of in-service operation—active—for both service units, the service units need not be configured to operate in two separate in-service states, making their configuration simpler. Since both service units are active and performing the same functions, both can be configured and maintained in the same way. Alternation by each service unit of the medium which it uses ensures that, in case of failure of a service unit or a medium, either service unit will be capable of using either medium to continue system operations. It also helps to pinpoint the source of problems; for example, if both service units generate errors when using a particular one of the media, it is likely that the problem lies with the medium and not with the service units. Since each served unit accepts the information from both service units and merely discards one of the duplicates of the information, the interaction between both service units and the served units is the same, thereby simplifying the design of both, as well as simplifying the inter-unit communications protocol. It also increases the probability that the served unit will receive the information at least once so that there is no loss of information to the served unit. The net result is an architecture that is robust and fault-tolerant, yet cost-effective to implement, and easy to configure, document, maintain, and service. All this leads to reduced cost for providing a reliable service.

These and other advantages and features of the invention will become more apparent from the following description of an illustrative embodiment of the invention considered together with the drawing.

DETAILED DESCRIPTION

Figure 1:
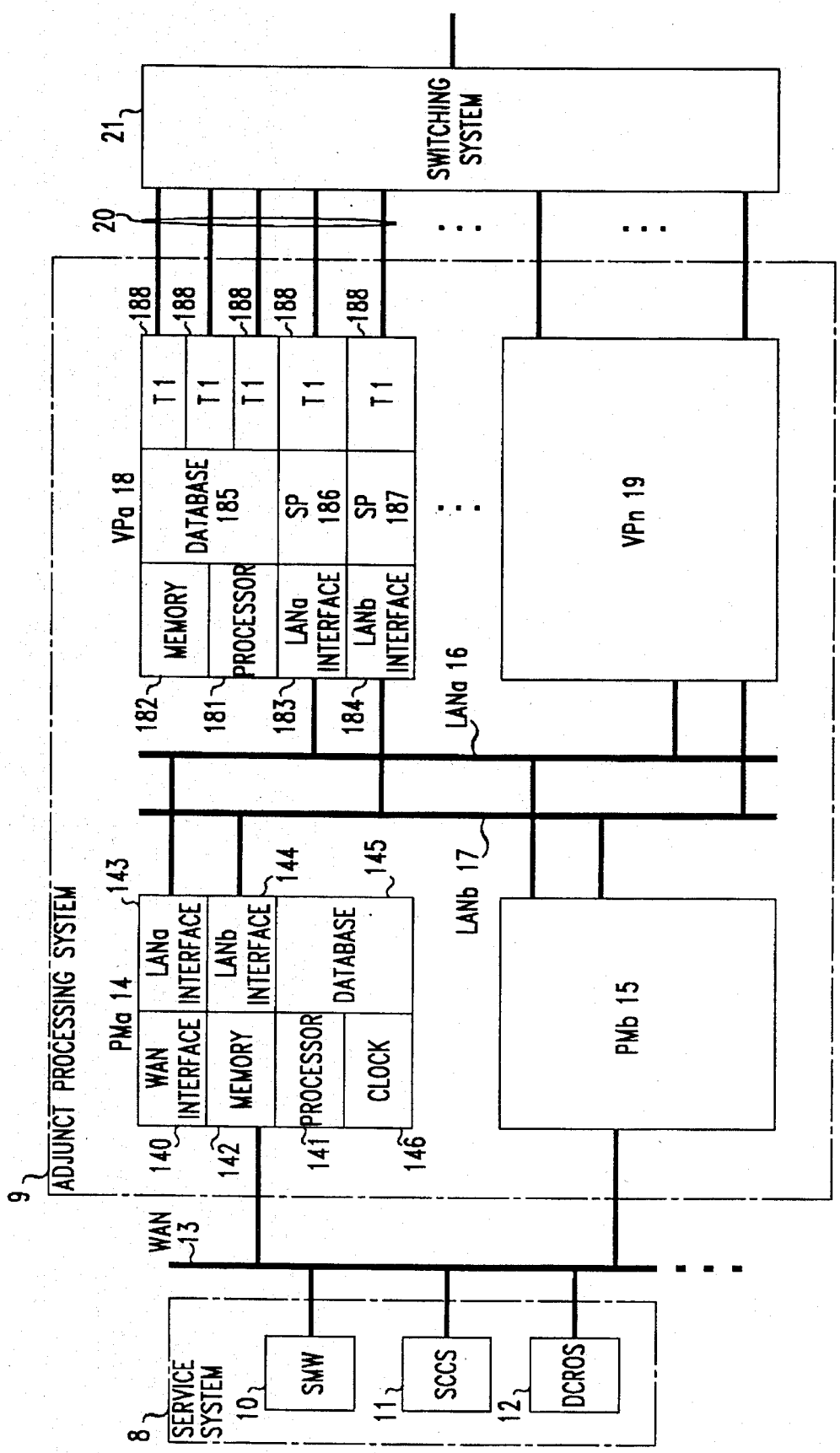
FIG. 1 is a block diagram of a processing environment that includes an illustrative embodiment of the invention.

System Configuration (FIG. 1)

FIG. 1 shows an illustrative processing environment that includes an illustrative embodiment of the invention. The processing environment comprises a conventional telecommunications network switching system 21, such as the AT&T 4ESS switching system, that provides telecommunications functions in a conventional manner, an adjunct processing system 9 that supports features provided by switching system 21, and a services system 8 that manages and administers the shown adjunct processing system 9 and other adjunct-processing systems at other processing locations (not shown).

Adjunct processing system 9 provides call processing, consultation, conferencing, and announcement capabilities for certain features provided by switching system 21. It also collects call measurements. A service management workstation (SMW) 10 of service system 8 allows craft personnel to provision and retrieve customer records at adjunct processing system 9. A switching center control system (SCCS) 11 of service system 8 provides alarm monitoring functions that allow surveillance, control, and analysis of components of each adjunct processing system 9. And a data collection and reporting operations system (DCROS) 12 of service system 8 collects traffic measurements from adjunct processing system 9 for interpretation and processing. Illustratively, SMW 10 is implemented in a Sun workstation, SCCS 11 is implemented in an AT&T 3B2 computer, and DCROS 12 is implemented in an AT&T Conversant Voice Information System (VIS) 100C. Service system 8 is connected to adjunct processing system 9 by means of a wide-area network (WAN) 13, such as an AT&T Datakit WAN.

The locus of the invention is adjunct processing system 9. According to the invention, system 9 comprises a plurality of voice-processing (VPa–VPn) systems 18–19, and a pair of provisioning and maintenance (PMa and PMb) systems 14 and 15 which serve VPs 18–19, interconnected by a pair of local area networks (LANa and LANb) 16 and 17 that operate as independent communication media between PMs 14–15 and VPs 18–19. Illustratively, each LAN 16 and 17 is an NCR StarLAN 10 LAN.

VPs 18–19 provide the call processing, consultation, conferencing, and announcement capabilities in support of switching system 21 features. They also collect call measurements and send them to PMs 14–15, monitor their own functionality and send generated alarms to PMs 14–15, and take database updates from PMs 14–15 to keep customer record information up-to-date. VPs 18–19 are identical. Each is connected to switching system by a plurality of telephony T1 links 20 that support the primary-rate (PRI) ISDN protocol. Each T1 link 20 is terminated in a VP 18–19 on a conventional TI circuit card 188. Each VP 18–19 includes two signal processors (SP) 186 and 187. One signal processor provides voice announcements while the other signal processor terminates the PRI protocol for calls. Each VP 18–19 has an identical database (DB) 185, containing customer call records with routing information that is used by switching system 21 to direct and manage call requests. Since databases 185 of all VPs 18–19 are identical, each VP 18–19 is individually capable of providing all VP functions. Switching system 21 typically uses VPs 18–19 on a round-robin rotating basis. Hence, the loss of one or more VPs adversely affects only the throughput but not the capabilities of adjunct processing system 9. Processing functions in each VP 18–19 are performed by a processor 181 driven by a clock (not shown) and executing programs out of a memory 182, in a conventional manner. Each VP 18–19 also includes a pair of LAN interfaces (LANa INTERFACE LANb INTERFACE) 183 and 184 which connect the VP to LANs 16 and 17, respectively, for communicating with PMs 14–15. Illustratively, each VP 18–19 is implemented in an AT&T Conversant VIS 100C.

PMs 14–15 provide centralized administration, maintenance, alarming, and database management for all VPs 18–19 in adjunct processing system 9. PMs 14–15 serve as an intermediary between service system 8 and VPs 18–19. They download call-record information and system administration data for VPs 18–19 from service system 8, and provide call measurements and alarms to service system 8. PMs 14–15 are identical, thereby allowing adjunct processing system 9 to continue functioning normally even if one of the two PMs 14–15 should fail. Normally, both PMs 14–15 are active at all times; neither is designated as a backup. However, one PM is administered as "preferred"; this PM serves as the centralized collection point for measurement data and alarm messages for all VPs 18–19. Each PM 14–15 includes a pair of LAN interfaces (LANa INTFC and LANb INTFC) 143 and 144 which connect the PM to LANs 16 and 17, respectively, for communicating with VPs 18–19. Each PM 14–15 further includes a WAN interface 140 which connects the PMs to WAN 13 for communicating with service system 8. Each PM 14–15 has an identical database (DB) 145, which includes a copy of database 185 of VPs 18–19. Processing functions in each PMs 14–15 are performed by a processor 141 driven by a clock 146 and executing programs out of a memory 142, in a conventional manner. Illustratively, each PM 14–15 is likewise implemented in an AT&T Conversant VIS 100C.

The fact that all PMs 14–15 and VPs 18–19 are each implemented on the same platform, such as the Conversant system, dramatically simplifies the manufacturing, configuring, and maintaining of adjunct processing system 9. This reduces the complexity and cost of the system. It further makes it much simpler for craftpersons to learn and understand the system, making the system easier and less expensive to operate and service.

System Operation (FIGS. 2–8)

System functionality includes four basic categories of functions: customer records management, call measurements reporting, alarms reporting, and centralized system management (system administration and command execution). These categories of functions are described below. Each is implemented as a collection of interacting, cooperating processes that are stored in memories and executed in processors of VPs 18–19, PMs 14–15, and elements 10–12 of service system 8.

Figure 2:
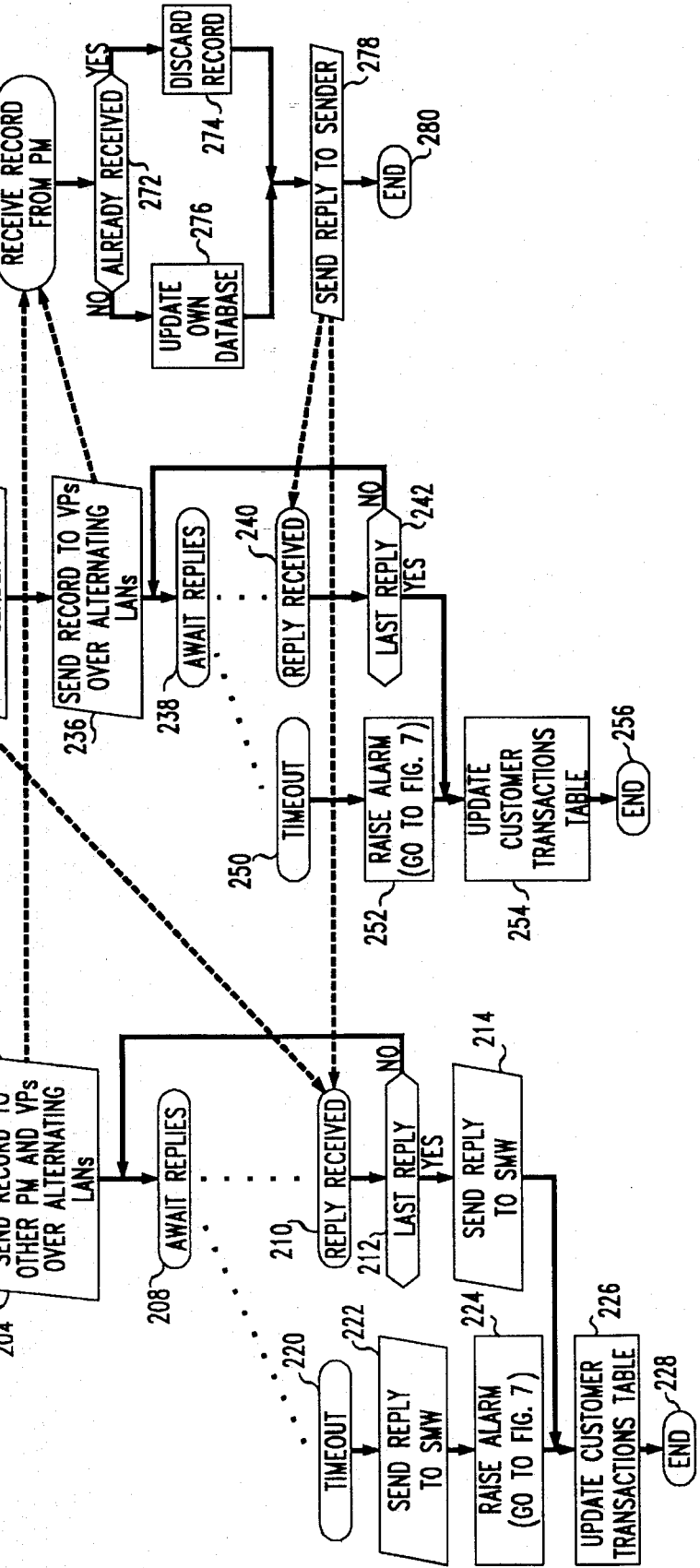
FIGS. 2–3 are flow diagrams of customer records management processing operations of the processing environment of FIG. 1.
Figure 3:
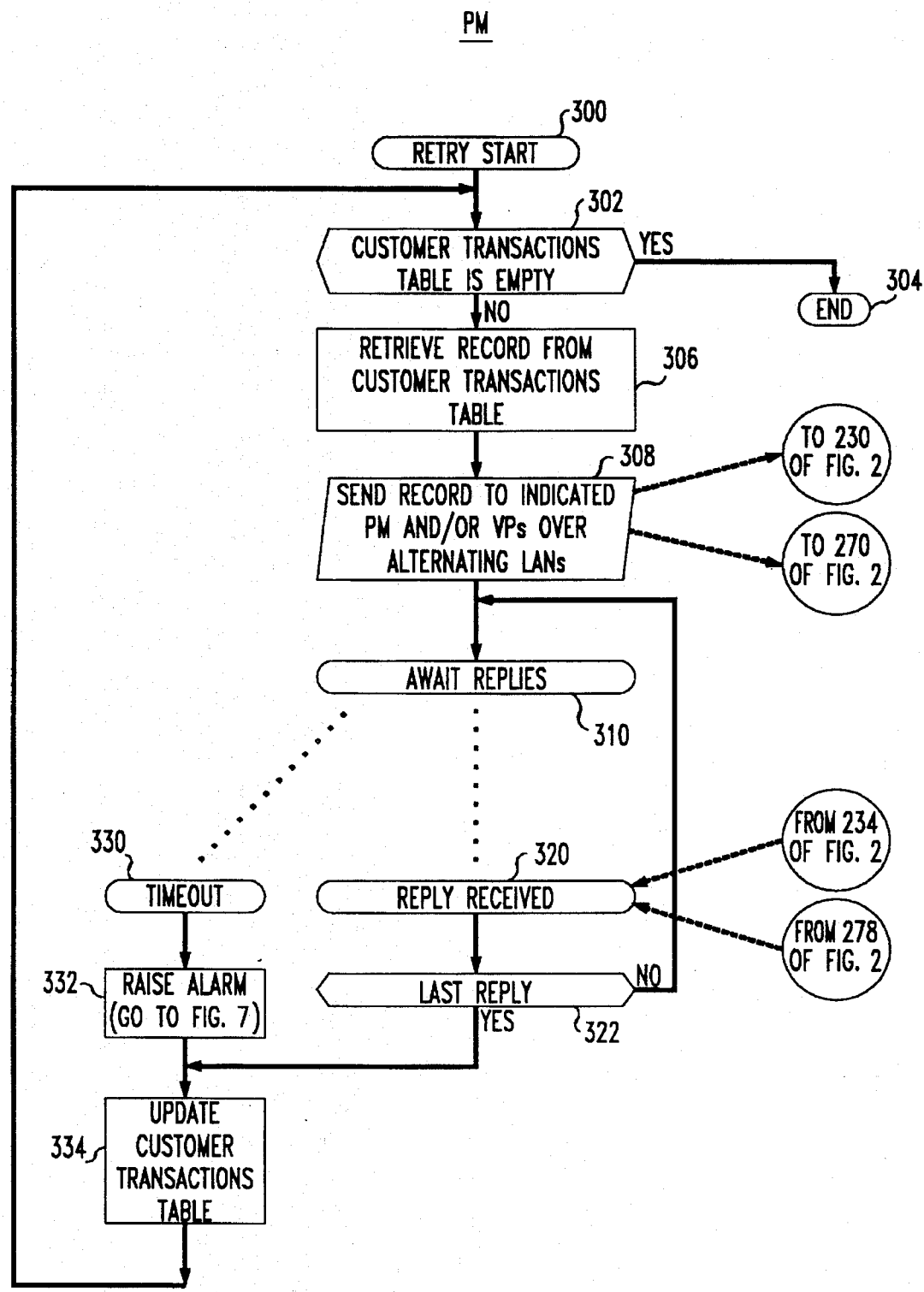

Customer Records Management (FIGS. 2–3)

A customer record stores the information required to process a call. This information is critical to the mission of adjunct processing system 9. Any addition, change, or deletion of a customer record is made by SMW 10. SMW 10 contains a master customer records database, out of which it provisions and administers the customer records in adjunct processing system 9. SMW 10 sends an updated customer record to a selected one of the two PMs 14–15 via WAN 13. Periodically, (e.g., every day), SMW 10 alternates, rotates, its selection of a PM, so as to exercise both PMs 14–15 and ensure that both PMs 14–15 are functional. For purposes of this discussion, assume that PM 14 is selected.

When the record arrives at selected PM 14, at step 200 of FIG. 2, selected PM 14 stores the record in its customer records database and makes an entry in a customer transactions table, at step 202. This table is used to track which PM and VPs have not yet had a provisioning parameter transaction installed thereon. Selected PM 14 then sends copies of the record to the other PM 15 and to each VP 18–19 over LANs 16–17, at step 204. When sending out the records, selected PM 14 alternates the use of LANs 16–17, sending successive record messages across different ones of LANs 16–17 so as to exercise both LANs 16–17 and LAN interfaces 143 and 144. Selected PM then waits for reply messages verifying that the record propagation to other PM 15 and to each VP 18–19 was successful, at step 208.

When the record arrives at other PM 15, at step 230, it stores the record in its customer records database, at step 232, and responds to the sending, selected, PM 14, at step 234. In addition, other PM 15 sends copies of the record to each VP 18–19 over LANs 16–17, at step 236, alternating its use of LANs 16–17 in the process just like selected PM 14. Because other PM 15 received its copy of the record from PM 14 and not from SMW 10, it does not send a copy thereof to PM 14. Then, like selected PM 14, it waits for reply messages from VPs 18–19, at step 238.

When a record arrives at a VP 18–19 from PM 14 or 15, at step 270, the recipient VP 18–19 checks whether it has already received the record from one of the PMs 14–15, at step 272. If so, the recipient VP 18–19 discards the record, at step 274; if not, the recipient VP 18–19 stores the record in its customer records database, at step 276. The recipient VP 18–19 then responds to the sending PM via a LAN 16 or 17 to acknowledge receipt of the record, at step 278, and ends its record update processing, at step 280.

Upon receipt of a reply, at step 210, selected PM 14 checks whether all VPs 18–19 and other PM 15 have responded to selected PM 14, at step 212. If so, selected PM 14 sends a reply message with this information to SMW 10, at step 214; if not, selected PM 14 returns to step 208 to await further replies. If all VPs 18–19 and other PM 15 have not responded to selected PM 14 within a timeout period, which expires at step 220, selected PM 14 sends a reply message with this information to SMW 10, at step 222, and also sends an alarm message to SCCS 11, at step 224.

Following step 214 or 224, selected PM 14 updates its customer transactions table, at step 226, by deleting therefrom identities of those units from which it had received a reply at step 210. Selected PM 14 then ends its record update processing, at step 228. Selected PM 14 will retry, at a later time and in proper order, any unsuccessful installations indicated in the customer transactions table.

Upon receipt of a reply from a VP 18–19, at step 240, other PM 15 checks whether all VPs 18–19 have yet responded. If not, other PM 15 returns to step 238 to await further replies; if so, other PM 15 updates its customer transactions table accordingly, at step 254. Because other PM 15 received its copy of the record from PM 14 and not from SMW 10, it does not send a reply message to SMW 10. However, if all VPs 18–19 did not respond within a timeout period, which expires at step 250, other PM 15 does send an alarm message to SCCS 11, at step 252. Other PM 15 then updates its customer transactions table accordingly, at step 254. Following step 254, other PM 15 ends its record update processing, at step 256. Other PM 15 will retry, at a later time, any unsuccessful installations.

Periodically, a PM 14 or 15 is triggered to retry the unsuccessful installations, at step 300 of FIG. 3. In response, triggered PM 14 or 15 determines if there are any unsuccessful installations indicated in the customer transactions table, at step 302. If not, triggered PM 14 or 15 ends the retry processing, at step 304. If there are unsuccessful installations to be retried, triggered PM 14 or 15 retrieves a record from the customer transactions table, at step 306, and sends it to whichever PM and VPs are indicated in the table as not having had the record installed thereon, at step 308. Triggered PM 14 or 15 then awaits reply messages verifying that the record propagations were successful, at step 310.

The response of any PM and VP to which the record was sent is shown in FIG. 2.

Upon receipt of a reply, at step 320, triggered PM 14 or 15 checks whether all PMs and VPs to which the record was sent have replied, at step 322. If not, triggered PM 14 or 15 returns to step 310 to await further replies; if so, triggered PM 14 or 15 updates its customer transactions table accordingly, at step 334, and then returns to step 302 to determine whether there are further unsuccessful installations to retry.

If all PMs and VPs to which the record was sent have not replied within a timeout period, which expires at step 330, triggered PM 14 or 15 sends an alarm message to SCCS 11, at step 332, and again updates its customer transactions table accordingly, at step 334. Triggered PM 14 or 15 then returns to step 302.

Selected PM 14 also performs a daily audit (which can also be performed on demand) of the customer record database on other PM 15 and each VC 18–19. Inconsistencies are automatically fixed by selected PM 14. SMW 10 may query selected PM 14 for the customer record audit results.

SMW 10 can also request from a PM 14 or 15 the retrieval of one or more records, for example, for audit purposes. The requested PM 14 or 15 searches its database for records which match the criteria of the request and returns to SMW a file which contains all of the matching records.

In addition, SMW 10 can query a PM 14 or 15 for site administration data.

Figure 4:
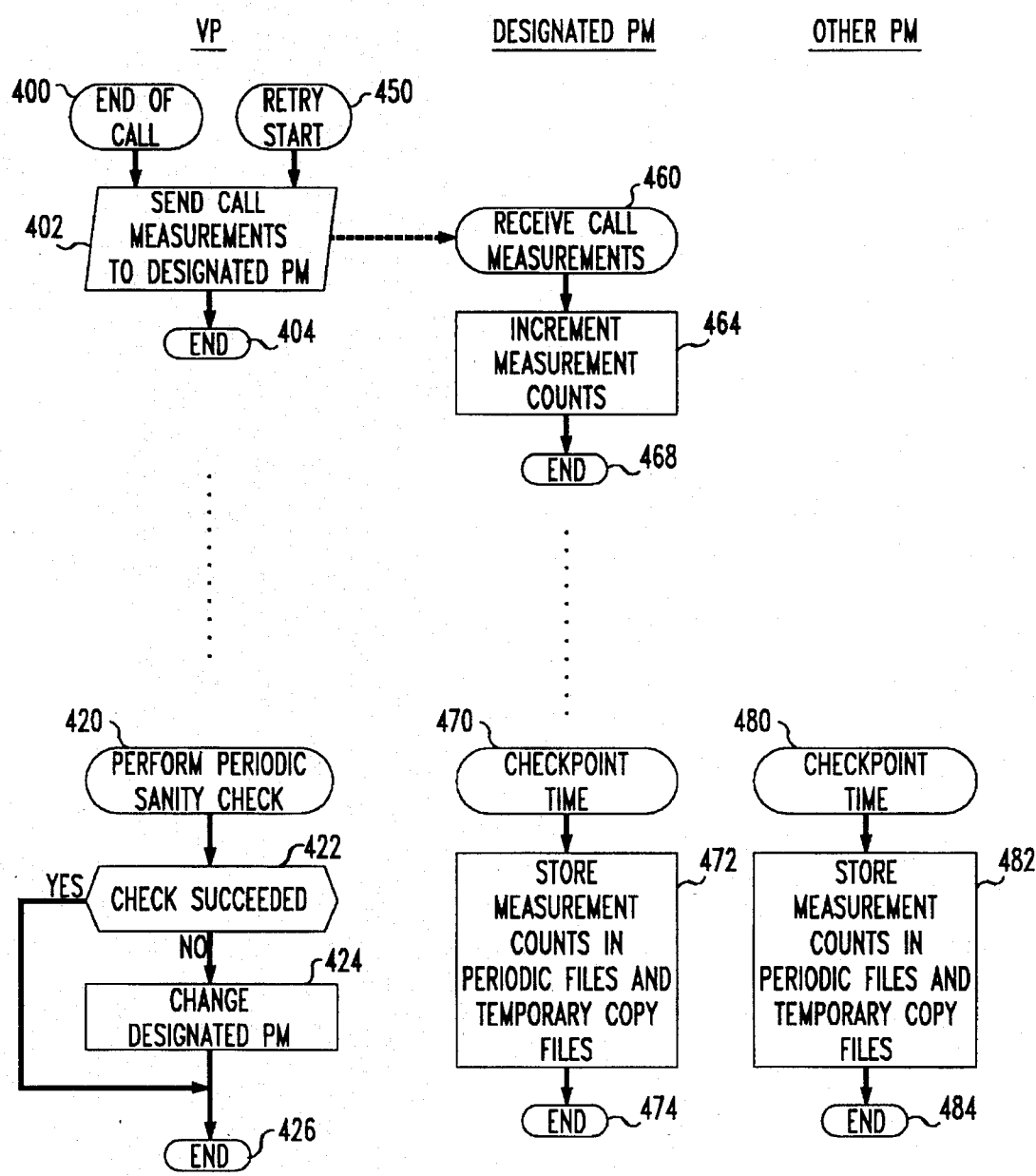
FIGS. 4–6 are flow diagrams of call measurement processing operations of the processing environment of FIG. 1.
Figure 5:
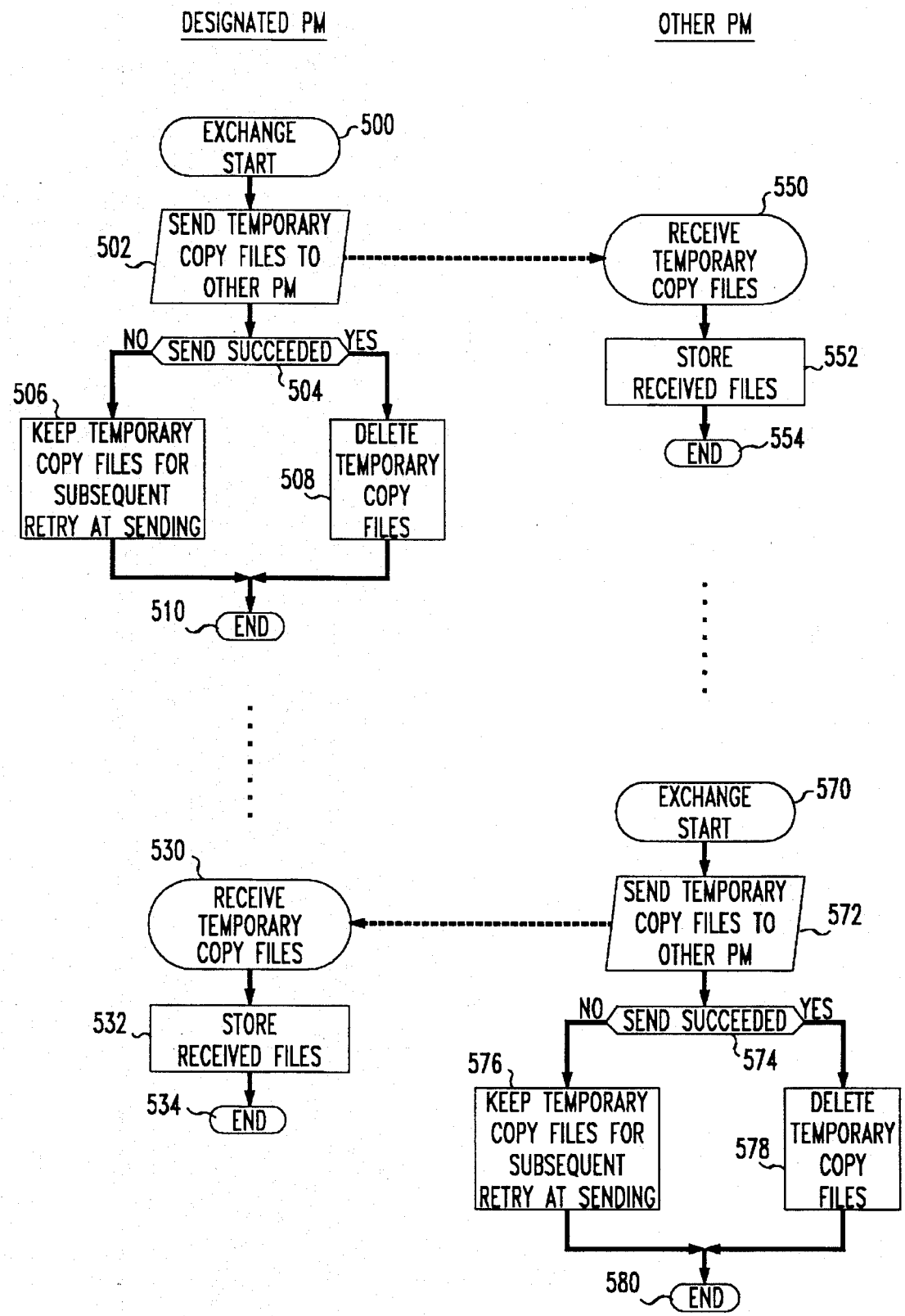
Figure 6:
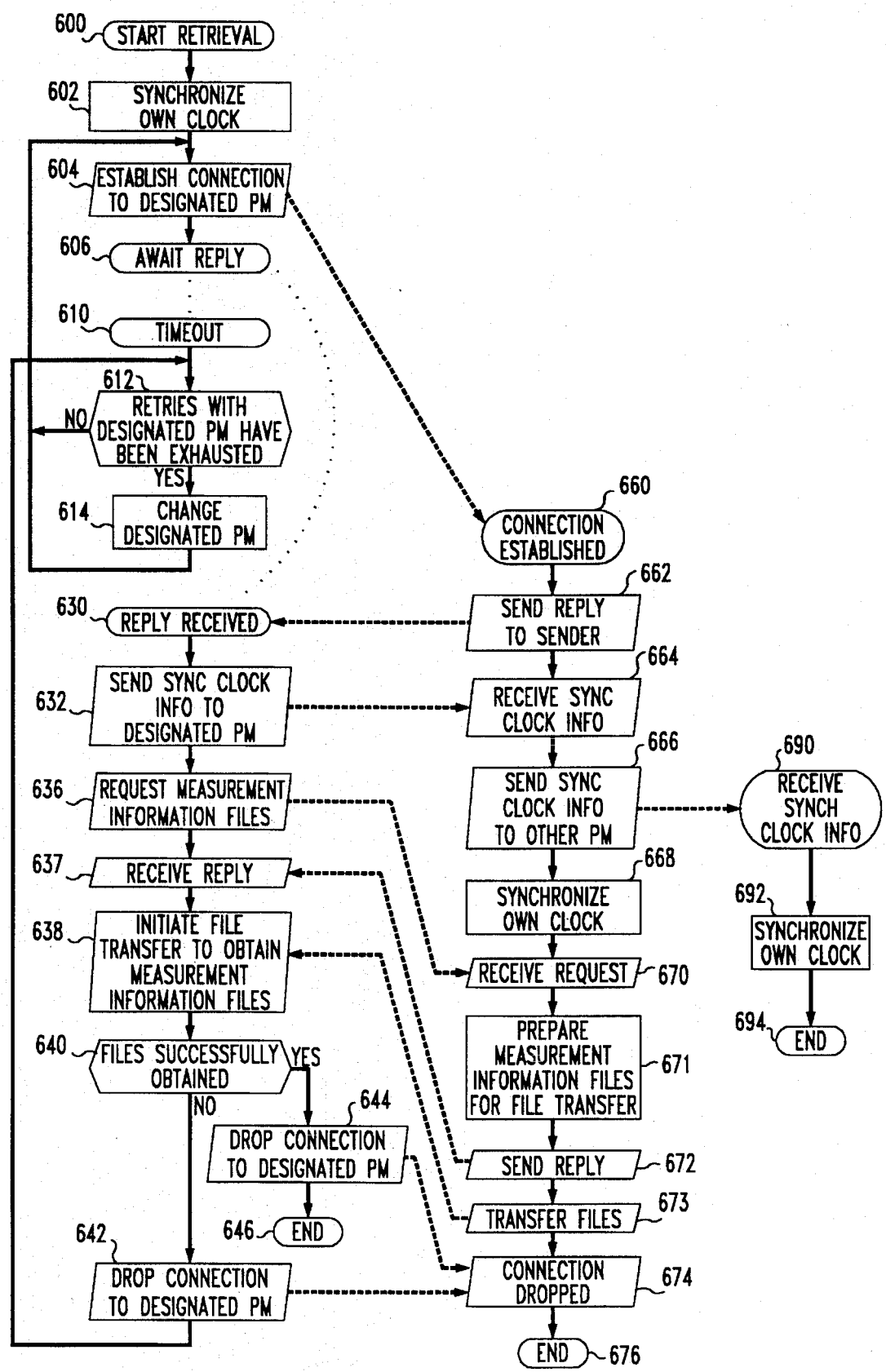

Call Measurements (FIGS. 4–6)

Each VP 18–19 collects call measurement information for each call that it processes. At the end of each call, at step 400 of FIG. 4, this measurement information for the call is sent to a designated one of PMs 14–15, at step 402, and then ends its call-related operations, at step 404. With each call-measurement message that it sends out, each VP 18–19 alternates its use of LANs 16 and 17, thereby exercising both LANs. At the beginning of its operation, a VP 18, 19 always sends the measurement data to the one PM which has been designated as the preferred PM. Periodically, each VP 18, 19 performs a sanity check, at step 420, to determine whether its communications with the preferred PM are successful. If the sanity check succeeds, as determined at step 422, a VP 18, 19 merely ends the check, at step 426. If, however, the sanity check fails, as determined at step 422, a VP 18, 19 changes the designated PM from the presently-designated PM to the other PM, at step 424, and then ends the check, at step 426.

A PM 14 or 15 that receives call measurement information from VPs 18–19, at step 460, uses the received call measurement information to increment measurement counts in its memory 142, at step 464, and ends this processing, at step 468. Periodically (e.g., at 15-minute and hourly intervals), each PM 14 and 15 is triggered, at step 470, to store its measurement counts in periodic files which DCROS 12 collects to provide periodic and on-demand call reports, and also in temporary copy files which it uses to update the other PM (as shown in FIG. 5), at step 472. The periodic files and temporary copy files are stored on a non-volatile medium (e.g., disk), whereby the information is protected against loss from memory (e.g., due to a power interruption). The PM then ends this processing, at step 474.

Periodically, the two PMs 14 and 15 exchange their temporary copy files. Each PM 14 and 15 is periodically triggered to undertake the exchange, at step 500 or 570, respectively, of FIG. 5. The triggered PM 14, 15 responds by sending all of its temporary copy files to the other PM 15, 14, at step 502 or 572, respectively. The triggered PM 14, 15 then makes a determination, based on input provided by the LAN communications facilities, of whether or not the sending succeeded, at step 504. If the sending did not succeed, the triggered PM 14, 15 retains the temporary copy files, at step 506 or 576, respectively, and it will retry sending these files to the other PM the next time that it is triggered at step 500 or 570, respectively. If the sending did succeed, the triggered PM 14, 15 deletes the temporary copy files, at step 508 or 578, respectively. The triggered PM 14, 15 then ends the exchange operation, at step 510 or 580, respectively.

The other PM 15, 14 receives the sent temporary copy files, at step 550 or 530, respectively, and stores them, at step 552 or 532, respectively. The receiving PM 15, 14 then ends the transferred-file processing, at step 554 or 534, respectively. Hence, each PM 14 and 15 has an identical and a full record of all calls' call measurements. These exchanges serve, for example, to resynchronize the data contents of a PM that was out of service but has been returned to service, with the data contents of the PM that had remained active.

Periodically (e.g., each day around midnight), DCROS 12 begins its process of collecting, storing and formatting the data, at step 600 of FIG. 6. DCROS 12 starts by synchronizing its internal clock with an outside source (e.g., a conventional telephony network timing source), at step 602. DCROS 12 then attempts to establish a connection to a designated one of PMs 14–15 via WAN 13, at step 604, attempting to obtain an application-level handshake with the designated PM, at step 606. Initially, the designated PM is the one that has been designated as the preferred PM. If the attempted connection fails because DCROS 12 has not obtained the handshake within a timeout period that expires at step 610, DCROS 12 checks, at step 612, whether it has exhausted a predetermined number (e.g., three) of tries at obtaining the handshake. If the tries have not been exhausted, DCROS 12 returns to step 604 to try again. If the tries have been exhausted, DCROS 12 changes the designated PM from the presently-designated PM to the other PM, at step 614, and then returns to step 604 to try and establish a connection with the newly-designated PM. DCROS 12 continues these attempts until it succeeds in establishing a connection to one of the PMs 14 and 15.

When DCROS 12 succeeds in establishing a connection to the designated one of the PMs 14–15, at step 660, the designated PM 14 or 15 sends back an acknowledging handshake reply, at step 662. If DCROS 12 receives the acknowledging handshake reply, at step 630, before expiration of the timeout period at step 610, DCROS 12 sends clock-synchronizing information to the designated PM 14 or 15, at step 632, to enable it to synchronize its internal clock with DCROS' 12 clock. The designated PM 14 or 15 receives the synchronizing information, at step 664, and propagates the synchronizing information to the other PM 15 or 14, at step 666. The designated PM 14 or 15 then synchronizes its internal clock with DCROS' clock, at step 668.

When the other PM 15 or 14 receives the propagated synchronizing information, at step 690, it likewise synchronizes its internal clock with DCROS' clock, at step 692, and then ends this processing, at step 694.

DCROS 12 then requests the designated PM 14 or 15 to prepare the measurement-information files (created at step 472 of FIG. 4 and at step 532 or 552 of FIG. 5) for transfer to DCROS 12, step 636. The contacted PM 14 or 15 receives the request, at step 670, and responds by preparing the measurement-information files for a file transfer to DCROS 12 over WAN 13, at step 671. The preparation includes extracting from non-volatile memory both the periodic files and temporary copy files received from the other PM, and combining the periodic files with the contents of the temporary copy files received from the other PM. The contacted PM 14 or 15 then replies to DCROS 12 to inform it that the files are ready, at step 672. DCROS 12 receives the reply, at step 637, and DCROS 12 then initiates a file transfer of the prepared measurement-information files over WAN 13 to itself, at step 638, in order to obtain the call measurement information, and the contacted PM 14 or 15 transfers the files to DCROS 12, at step 673. DCROS 12 then checks whether the file transfer was successful, at step 640. If the transfer was successful, DCROS 12 drops the connection via WAN 13 to the designated PM 14 or 15, at step 644, and ends the measurement data retrieval process, at step 646. If, however, the file transfer was not successful, DCROS 12 drops the connection to the designated PM 14 or 15, at step 642, and then returns to step 612 to try and establish a new connection with one of the PMs 14 and 15.

When the designated PM 14 or 15 detects that the connection to DCROS 12 has been dropped, at step 674, it ends its interaction with DCROS 12, at step 676.

Periodically, each PM 14 or 15 examines its periodic files and deletes those that are older than a predetermined amount of time (e.g., one week.)

At any time, DCROS 12 can also query a PM 14 or 15 for near-real-time reports, of the immediately preceding one or more periods (e.g., 15 minutes, one hour), in substantially the same manner.

Figure 7:
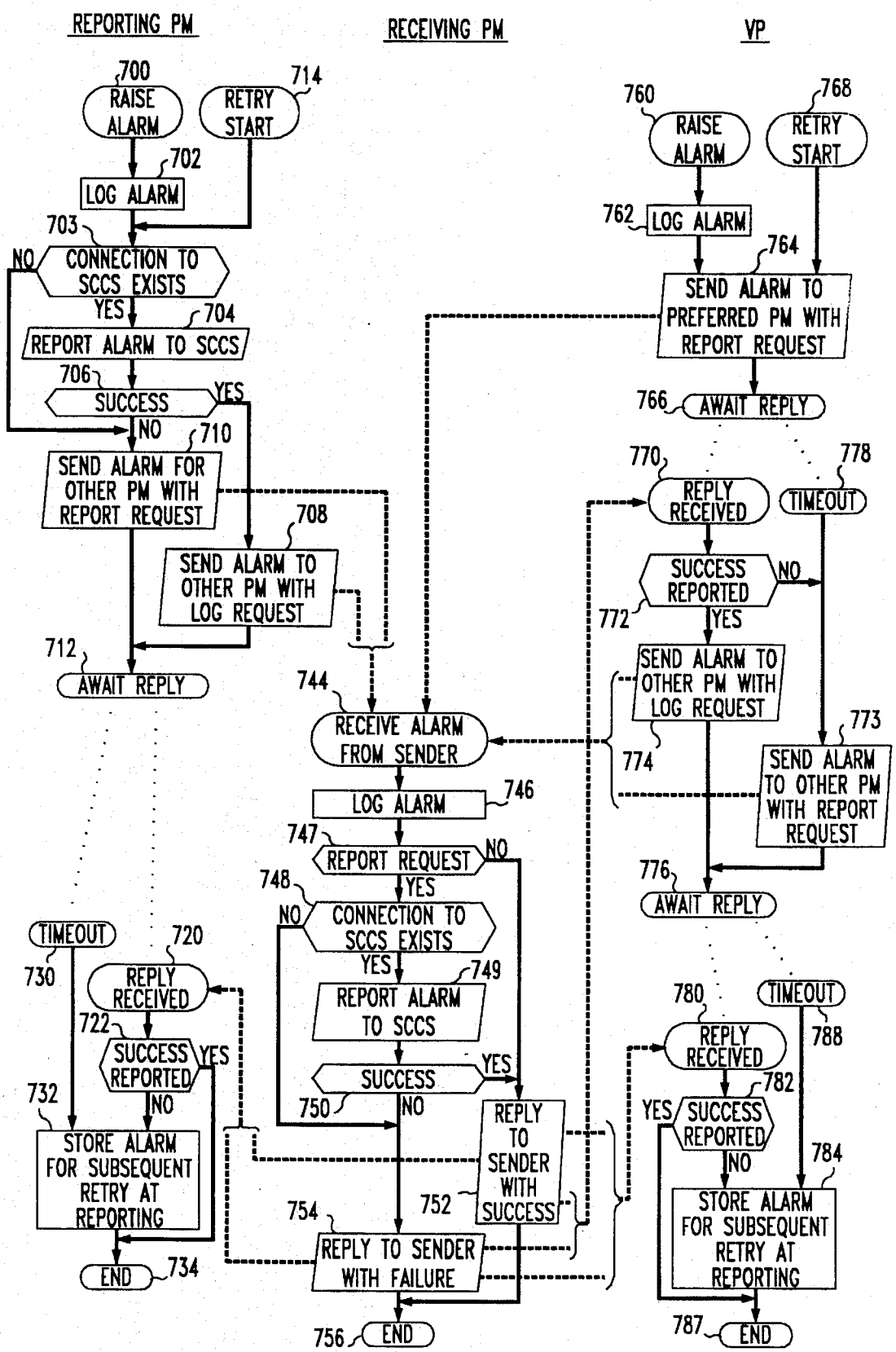
FIG. 7 is a flow diagram of alarm processing operations of the processing environment of FIG. 1.

Alarms (FIG.7)

SCCS 11 is the network alarm monitoring system. It has a semipermanent (nailed-up) connection across WAN 13 to each PM 14–15 and monitors alarm status thereacross. PMs 14 and 15 report their own alarms and VPs' alarms over these connections.

Each PM 14–15 monitors its processes for errors, and error conditions are analyzed to determine whether alarms should be raised. If a PM 14 or 15 determines that an alarm should be raised as a result of a local error condition, at step 700, it logs the alarm in an internal log, at step 702. It then checks whether it has a "nailed-up" connection to SCCS 11 over which it can report the alarm, at step 703: if not, reporting is not possible and therefore it proceeds to step 710; if so, it reports the alarm to SCCS 11 over the nailed-up connection across WAN 13, at step 704. The reporting PM 14 or 15 then determines, based on input provided by the WAN communications facilities, whether the reporting succeeded, at step 706. If the reporting succeeded, the reporting PM 14 or 15 sends the alarm via a message over one of the LANs 16–17 to the other PM 15 or 14 with an indication to only log the alarm in its log, at step 708. If reporting of the alarm is determined at step 706 to have failed, or if a "nailed-up" connection to SCCS 11 was found at step 703 not to exist, the reporting PM 14 or 15 sends the alarm to the other PM 15 or 14 with an indication to not only log the alarm but also to report it to SCCS 11, at step 710. Following step 708 or 710, the reporting PM 14 or 15 awaits a reply from the other PM 15 or 14, at step 712.

Each VP 18–19 likewise monitors its processes for errors, and error conditions are analyzed to determine whether alarms should be raised. If a VP 18, 19 determines that an alarm should be raised, at step 760, VP 18, 19 logs the alarm, at step 762, and sends it via a message over one of the LANs 16–17 to one of PMs 14–15 which is designated as the preferred PM, at step 764. Assume that PM 14 is so designated. VP 18, 19 then awaits a response from preferred PM 14, at step 766.

Each PM 14, 15 logs every alarm that it receives from VPs 18–19 or the other PM and, if necessary, reports it to SCCS 11. The receiving PM 15 or 14 receives the alarm from a VP 18–19 or the reporting, other, PM 14 or 15, at step 744, and logs it in, at step 746. The receiving PM 15 or 14 then checks, at step 747, whether the alarm is accompanied by a "log only" or a "report" request. If the request is "log only", the receiving PM 15 or 14 sends a reply to the originator of the alarm accompanied by a success indication, at step 752. If the request is "report", the receiving PM 15 or 14 checks whether it has a "nailed-up" connection to SCCS 11 over which it can report the alarm, at step 748. If not, reporting is not possible and therefore it proceeds to step 754; if so, it reports the alarm to SCCS 11 over the nailed-up connection via WAN 13, at step 749, and then checks, at step 750, whether the reporting succeeded. Depending upon the outcome of the checks at steps 748 and 750, the receiving PM 15 or 14 replies to the originator of the alarm with an indication of whether reporting of the alarm to SCCS 11 succeeded, at step 752, or failed, at step 754. Following steps 752 or 754, the receiving PM 15 or 14 ends the alarm processing, at step 756.

If the reporting PM 14 or 15 does not receive a reply to a "report" request from the receiving PM 15 or 14 at step 720 prior to expiration of a timeout period, at step 730, it stores the alarm for a subsequent retry of reporting the alarm, at step 732, and then ends its alarm processing, at step 734. The retry is triggered periodically, at step 714, and in response thereto the reporting PM 14 or 15 returns to step 703. If the reporting PM 14 or 15 does receive a reply from the receiving PM 15 or 14, at step 720, prior to the expiration of the timeout period at step 730, it checks the accompanying indication of whether the requested reporting of the alarm to SCCS 11 by the receiving PM 15 or 14 succeeded or failed, at step 722. If the reporting is indicated to have failed, the reporting PM 14 or 15 proceeds to step 732; if the reporting is indicated to have succeeded, the reporting PM 14 or 15 proceeds directly to step 734.

If an alarm-originating VP 18, 19 receives the acknowledgement from preferred PM 14 prior to expiration of a timeout period, at step 770, it checks the accompanying indication of whether the reporting of the alarm to SCCS 11 succeeded or failed, at step 772. If the acknowledgement from preferred PM 14 indicates that reporting succeeded, originating VP 18, 19 sends the alarm via a message over one of the LANs 16–17 to other PM 15 with an indication to only log the alarm in its local table, at step 774. But if the acknowledgement from preferred PM 14 indicates that reporting failed, the originating VP 18, 19 sends the alarm to other PM 15 with an indication to not only log the alarm in its local table but also to report the alarm to SCCS 11, at step 773. Originating VP 18, 19 treats expiration of the timeout period at step 778 while it is awaiting receipt of the acknowledgement from preferred PM 14 in the same way as it treats an acknowledgement with a failed reporting indication, and proceeds to step 773. Following step 773 or 774, originating VP 18, 19 awaits a reply from other PM 15, at step 776.

Other PM 15 responds to receipt of the alarm from originating VP 18, 19 in the manner described above for steps 744–756.

If originating VP 18, 19 receives the acknowledging reply from other PM 15 prior to expiration of a timeout period, at step 780, it checks the accompanying success or failure indication, at step 782. If success is reported, originating VP 18, 19 ends its alarm processing, at step 787. If failure is reported, originating VP 18, 19 stores the alarm for subsequent retry of reporting the alarm to SCCS 11, at step 784, and then ends its alarm processing, at step 787. Originating VP 18, 19 treats expiration of the timeout period, at step 788, while it is awaiting receipt of the reply from other PM 15 in the same way as it treats a reply with a failed reporting indication, and proceeds to step 784 to store the alarm for subsequent retry of reporting. The retry is triggered periodically, at step 768, and causes VP 18, 19 to execute steps 764 et seq.

Since each VP 18–19 internally logs each of its alarms, PMs 14–15 can query for logged alarms, at any time, over LANs 16–17.

As was indicated in FIG. 2, PM 14, 15 will generate an alarm whenever a VP 18, 19 does not respond to an update attempted by that PM 14, 15. Since both PMs 14–15 attempt all updates, SCCS 11 may be receiving two alarms, from the two PMs 14–15, with respect to a single update. SCCS 11 uses this fact to identify the likely source of the failure of the attempted update. If only one PM 14 or 15 sends an alarm, SCCS 11 suspects a problem in that PM 14 or 15 or in the LAN 16 or 17 which that PM 14 or 15 used for the attempted update. If both PMs 14 and 15 send an alarm, SCCS 11 suspects a problem in the VP 18, 19 that was being updated.

Each PM 14 and 15 also sends periodic heartbeat messages to SCCS 11, by means of which SCCS 11 is able to determine whether or not an individual PM is active.

Figure 8:
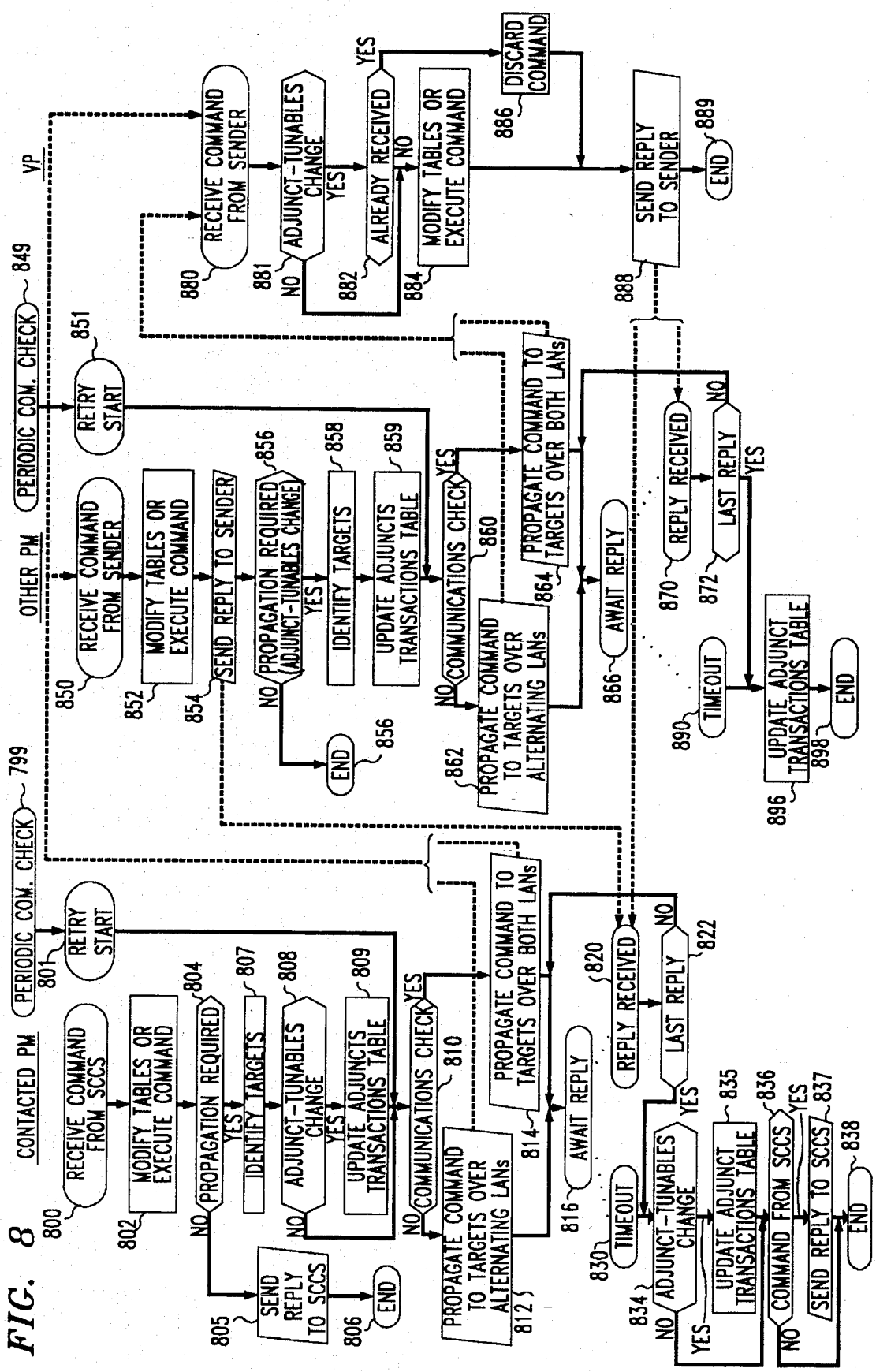
FIG. 8 is a flow diagram of command processing operations of the processing environment of FIG. 1.

Centralized System Management (FIG. 8)

PMs 14–15 also accept commands from SCCS 11 which are used to administer various PM internal details such as tables of administrative information, to provide communications-capability checks, and to allow for remote interaction with VPs 18–19. Tables of administrative information whose contents may be affected by a command include administered machine tables in PMs 14–15, whose contents track which PMs 14–15 and VPs 18–19 are presently active, adjunct tunables tables in PMs 14–15 and VPs 18–19, which contain various tunable parameter values pre-populated with default parameter values, and adjuncts transactions tables in PMs 14–15, which are used to track any adjunct tunable parameter transactions that have not yet been installed on any PM and VPs as well as the identity of the PM and VPs on which they remain to be installed.

Generally, SCCS 11 sends a command to only one of the two PMs 14–15. For purposes of this discussion, assume that SCCS 11 has sent a command to PM 14, referred to herein as the contacted PM. Contacted PM 14 receives the command, at step 800 of FIG. 8, and in response it either modifies its information tables in memory 142 accordingly, or otherwise executes the command, at step 802. If necessary, contacted PM 14 then propagates the command to other PM 15 and to one or more VPs 18–19. For example, a command to execute diagnostics on the receiving PM would not be propagated at all, while a command to execute diagnostics on a particular VP would be propagated only to that VP. Or, a command to modify contents of an administered machine table would be propagated only to other PM 15, while a command to modify contents of an adjunct tunables table would be propagated to both other PM 15 and all VPs 18–19. Contacted PM 14 determines, at step 804, whether propagation of the command is required. If not, contacted PM 14 sends a reply to the command to SCCS 11, at step 805, and then ends the command processing, at step 806; if so, it identifies the target PM 15 and/or VPs 18–19 to which the command should be propagated, at step 807. Contacted PM 14 then checks whether the command caused a change in contents of the adjunct tunables table, at step 808, and if so, it enters this information in its adjunct transactions table, at step 809. Contacted PM 14 then propagates the command to the identified targets via LANs 16–17. If the command being propagated is not a communications check, as determined at step 810, contacted PM 14 propagates it by alternating its use of LANs 16–17 between sequential messages, at step 812, as described previously. If, however, the command being propagated is a communications check, contacted PM 14 propagates it to each target via both LANs 16–17, at step 814, so as to check the continued communications viability of both LANs 16–17. Contacted PM 14 then awaits receipt of replies from the identified targets, at step 816.

If other PM 15 is an identified target, it receives the command, at step 850, modifies its information tables accordingly or otherwise executes the command, at step 852, and then sends an acknowledging reply to contacted PM 14, at step 854. If necessary, other PM 15 then propagates the command to one or more VPs 18–19. Other PM 15 determines, at step 856, whether propagation of the command is required. Only commands that caused a change in contents of the adjunct tunables table need be propagated. If not, other PM 15 ends its command processing, at step 856; if so, it identifies target VPs 18–19 to which the command should be propagated, at step 858, and enters this information in its adjunct transactions table, at step 859. Other PM 15 then propagates the command to the identified targets via LANs 16–17. If the command being propagated is not a communications check, as determined at step 860, other PM 15 propagates it by alternating its use of LANs 16–17 between sequential messages, at step 862. If, however, the command being propagated is a communications check, other PM 15 propagates it to each target via both LANs 16–17, at step 864. Other PM 15 then awaits receipt of replies from the identified targets, at step 866.

If a VP 18, 19 is an identified target of either PM 14 or 15, it receives the command, at step 880, and checks whether the command causes a change in contents of the adjunct tunables table, at step 881. If not, target VP 18, 19 proceeds to step 884; if so, target VP 18, 19 checks whether it has already received that command from one of the PMs 14 or 15, at step 882. If not, target VP 18, 19 modifies its tables or otherwise executes the received command, at step 884; if so, target VP 18–19 discards the received command, at step 886. Following step 884 or 886, target VP 18, 19 sends an acknowledging reply, at step 888, to whichever PM 14 or 15 had sent the command. Target VP 18, 19 then ends command processing, at step 889.

Contacted PM 14 or other PM 15 receives an acknowledging reply from a target, at step 820, and checks, at step 822, whether this is the last expected reply. If not, it returns to step 816 to await further replies. If this is the last expected reply, contacted PM14 checks whether the propagated command was one that caused a change in contents of the adjunct tunables table, at step 835, and if so, it updates its adjunct transactions table accordingly, at step 835. Contacted PM 14 then checks whether the propagated transaction had been a command received from SCCS 11 at step 800, at step 836. If so, contacted PM 14 sends a reply to SCCS 11 indicating the results of the transaction, at step 837, and then ends the transaction processing, at step 838. If not, contacted PM 14 merely ends the transaction processing, at step 838. If replies from all targets are not received by contacted PM 14 before expiration of a timeout period, at step 830, contacted PM 14 proceeds to steps 834 et seq.

Other PM 15 receives an acknowledging reply from a target, at step 870, and checks, at step 872, whether this is the last expected reply. If not, it returns to step 866 to await further replies; if so, it updates its adjunct transactions table accordingly, at step 896, and then ends the transaction processing, at step 898. If replies from all targets are not received by other PM 15 before expiration of a timeout period, at step 890, other PM 15 proceeds to steps 896 et seq.

Subsequently, when propagation retry is triggered, at step 801 or 851, respectively, (such as by occurrence of a periodic communications check, at steps 799 or 849, respectively), contacted PM 14 or other PM 15 proceeds to steps 810 et seq. or 860 et seq., respectively, to retry propagating any commands indicated by its update adjuncts transactions table to not have been propagated to all targets.

As indicated above, one command that contacted PM 14 does propagate to other PM 15 is a command to perform an application-to-application communications check with VPs 18–19. This check is performed by both PMs 14–15 with each of VPs 18–19 using both LANs 16–17. As part of this check, PMs 14–15 propagate to VPs 18–19 synchronization information received from DCROS 12 (see FIG. 6, steps 632 et seq.) so that VPs 18–19 may likewise synchronize their internal clocks with DCROS' clock. Successful completion of this test between a PM 14, 15 and a VP 18, 19 initiates an attempt, at step 300 of FIG. 3, or step 801 or 851 of FIG. 8, by that PM 14, 15 to provision that VP 18, 19 with all transactions listed in that PM's customer transactions table or adjunct transactions table (i.e., previously-attempted transactions that had failed). Successful completion of this test between a PM 14, 15 and the other PM 15, 14 or a VP 18, 19 also initiates an attempt, at step 714 or 768 of FIG. 7, to inform the PMs 14, 15 of any previously-unreported alarms.

Of course, various changes and modifications to the illustrative embodiment described above will be apparent to those skilled in the art. For example: more than two PMs may be included in the system; the PMs' retry strategies may be different such that every PM does not report every transaction to each VP; the concept of a "preferred" PM need not be used and instead transactions may merely be alternated between the PMs; measurement data may be reported to PMs only at predetermined intervals; certain database information may be centralized in a PM and may be accessed by each VP only as needed; clock synch information need not be provided through DCROS; etc. Such changes and modifications can be made without departing from the spirit and the scope of the invention and without diminishing its attendant advantages. It is therefore intended that such changes and modifications be covered by the following claims.

We claim:

1. A fault tolerance redundancy system for communication comprising:

a pair of redundant service units;

a pair of communication media both connected to each service unit;

a plurality of served units, each connected to both communication media;

each service unit of the pair of redundant service units responsive to receipt by the redundancy apparatus of information for the served units by communicating the information individually to the served units, each service unit of the pair of redundant service units alternately using a different one of the communication media to communicate the information to successive ones of the served units; and each served unit responsive to receipt of the information from one of the service units of the pair of redundant service units by using the information received from the one of the service units of the pair of redundant service units, and further responsive to receipt of the information from another of the service units of the pair of redundant service units by discarding the information received from the other of the service units of the pair of redundant service units.

2. The apparatus of claim 1 wherein:

every service unit and every served unit includes a copy of a database of received information;

a first of the service units is responsive to receipt of the information from an information source by storing the received information in its copy of the database and communicating the received information to a second of the service units and to each served unit;

the second of the service units is responsive to receipt of the information from the first of the service units by storing the received information in its copy of the database and communicating the received information to each served unit; and each served unit is responsive to receipt of the information from the one service unit by storing the received information in its copy of the database.

3. The apparatus of claim 2 wherein:

each served unit is further responsive to receipt of the information from a service unit, and the second of the service units is further responsive to receipt of the information from the first of the service units, by sending an acknowledgment of the receipt across one of the communication media to the service unit from which the information was received; and each service unit of the pair of redundant service units is further responsive to a failure to timely receive the acknowledgment from every one of the served units and service unit of the pair of redundant service units to which it had communicated the received information within a predetermined period of time by communicating the information again at a later time to any served unit and service unit of the pair of redundant service units from which the acknowledgment was not timely received.

4. The apparatus of claim 1 wherein:

each served unit is responsive to a predetermined event at the served unit by communicating data about the predetermined event to a selected one of the pair of redundant service units across one of the communication media, and is further responsive to a failure of a periodic check of its ability to communicate with the selected service unit of the pair of redundant service units by selecting another of the pair of redundant service units; and each one of the pair of redundant service units is responsive to receipt of the communicated data from an individual served unit by using the received communicated data.

5. The apparatus of claim 4 wherein:

each one of the service units is responsive to receipt of the communicated data from a served unit by storing the received data; and the pair of service units periodically exchange copies of the stored received data and each service unit stores any exchanged data that it has not previously received;

whereby same data exists in both service units.

6. The apparatus of claim 5 wherein:

each service unit of the pair of redundant service units comprises a clock and said each service unit is responsive to establishment of a connection to said each service unit over a third communication medium by sending a response via the connection, is responsive to receipt of synchronizing information via the connection by synchronizing its clock to the received synchronizing information and sending the synchronizing information to another service unit of the pair of redundant service units over one of the communication media of the pair, is responsive to receipt of synchronizing information over one of the communication media of the pair by synchronizing its clock to the received synchronizing information, and is responsive to receipt of a request for the stored data via the connection by making the stored data available through the connection.

7. The apparatus of claim 1 wherein:

each individual served unit is responsive to every predetermined event at the individual served unit by communicating a first type of indication of the predetermined event to a first one of the pair of redundant service units across one of the communication media, is responsive to a timely receipt of a first type of acknowledgment of the first type of indication from the first one of the pair of redundant service units by communicating a second type of indication of the predetermined event to a second one of the pair of redundant service units across one of the communication media, and is responsive to either receipt of a second type of acknowledgment of the first type of indication from the first one of the pair of redundant service units or a failure to receive a timely acknowledgment of the first type of indication from the first one of the pair of redundant service units by communicating the first type of indication of the predetermined event to the second one of the pair of redundant service units across one of the communication media; and the first and the second one of the pair of redundant service units is each responsive to receipt of the first type of indication from the individual served unit by logging the received indication and reporting the received indication to a destination, communicating the first type of acknowledgment to the individual served unit in response to a success of the reporting, and communicating the second type of acknowledgment to the individual served unit in response to a failure of the reporting; and the second one of the pair of redundant service units is responsive to receipt of the second type of indication from the individual served unit for logging the received indication but not reporting the received indication to the destination, and communicating the first type of acknowledgment to the individual served unit.

8. The apparatus of claim 7 wherein:

each service unit of the pair of redundant service units is responsive to every predetermined event at said each service unit by logging the predetermined event and reporting the predetermined event to the destination, is responsive to a success of the reporting by communicating the first type of indication of the predetermined event to another one of the pair of redundant service units across one of the communication media, and is responsive to a failure of the reporting by communicating the second type of indication of the predetermined event to said another one of the pair of redundant service units across one of the communication media; and said another one of the pair of redundant service units is responsive to receipt of the first type of indication from said each service unit by logging the received indication and reporting the received indication to the destination, communicating the first type of acknowledgement to said each service unit in response to a success of the reporting, and communicating the second type of acknowledgment to said each service unit in response to a failure of the reporting, and is further responsive to receipt of the second type of indication from said each service unit for logging the received indication but not reporting the received indication to the destination, and communicating the first type of acknowledgment to said each service unit.

9. The apparatus of claim 1 wherein:

a first service unit of the pair of redundant service units responds to receipt of a command from a source other than another service unit of the pair of redundant service units by taking action indicated by the command and communicates the command individually to selected ones of the served units and the other service unit of the pair of redundant service units, alternately using a different one of the communication media to communicate a first type of the command to successive ones of the selected ones of the served units and the other service unit of the pair of redundant service units and using both of the communication media to communicate a second type of the command to each one of the selected ones of the served units and the other service unit of the pair of redundant service units;

the other service unit of the pair of redundant service units responds to receipt of a command from the first service unit of the pair of redundant service units by taking action indicated by the command and determining whether the received command need be communicated to any of the served units, and responds to a determination that the received command need be communicated to selected ones of the served units by communicating the command individually to the selected ones of the served units, alternately using a different one of the communication media to communicate the command to successive ones of the selected ones of the served units; and each served unit responds to receipt of an individual command from one service unit of the pair of redundant service units by taking action indicated by the command received from the one service unit of the pair of redundant service units, and selectively responds to duplicate receipt of the individual command from both the one and another service unit of the pair of redundant service units by discarding the command received from the other service unit of the pair of redundant service units.

10. The apparatus of claim 9 wherein the second type of command comprises a check of communications capability.

11. A fault tolerance redundancy system for communication comprising:

a pair of redundant service units each including a copy of a database;

a pair of communication media both connected to each service unit;

a plurality of served units, each connected to both communication media and each including a copy of the database;

a first of the pair of redundant service units responsive to receipt of information from an information source by storing the received information in its copy of the database and communicating the received information individually to a second of the pair of redundant service units and to each served unit, the first of the pair of redundant service units alternately using a different one of the communication media to communicate the received information to successive ones of the second of the pair of redundant service units and the served units;

the second of the pair of redundant service units responsive to receipt of the information from the first of the pair of redundant service units by storing the received information in its copy of the database and sending an acknowledgment of the receipt to the first of the pair of redundant service units, and communicating the received information individually to each served unit, the second of the pair of redundant service units alternately using a different one of the communication media to communicate the received information to successive ones of the served units;

each served unit responsive to receipt of the information from one of the pair of redundant service units by storing the information received from the one of the pair of redundant service units in its copy of the database and sending an acknowledgment of the receipt across one of the communication media to the one of the pair of redundant service units, and further responsive to receipt of the information from another of the pair of redundant service units for discarding the information received form the other of the pair of redundant service units and sending an acknowledgment of the receipt across one of the media to the other of the pair of redundant service units; and each service unit further responsive to a failure to receive a timely acknowledgment, of receipt of the information that was communicated by said each service unit, from every served unit and service unit of the pair of redundant service units to which the information was communicated by said each service unit, within a predetermined period of time by subsequently communicating the information again to any served unit and service unit of the pair of redundant service units to which the information was communicated by said each service unit and from which the acknowledgment was not timely received.

12. The apparatus of claim 11 wherein:

each individual served unit is responsive to completion of a task at the individual served unit by communicating data about the task to a selected one of the pail of redundant service units across one of the communication media, and is further responsive to a failure of a periodic check of its ability to communicate with the selected one of the pair of redundant service units by selecting another of the pair of redundant service units;

each one of the pair of redundant service units is responsive to receipt of the communicated data from an individual served unit by storing the received communicated data; and the pair of redundant service units periodically exchange copies of the stored received data and each one of the pair of redundant service units stores any exchanged data that it has not previously received;

whereby same data is stored in both of the pair of redundant service units.

13. The apparatus of claim 12 wherein each service unit of the pair of redundant service units comprises a clock and said each service unit is responsive to establishment of a connection to said each service unit over a third communication medium by sending a response via the connection, is responsive to receipt of synchronizing information via the connection by synchronizing its clock to the received synchronizing information and sending the synchronizing information to another service unit of the pair of redundant service units over one of the communication media of the pair, is responsive to receipt of synchronizing information over one of the communication media of the pair by synchronizing its clock to the received synchronizing information, and is responsive to receipt of a request for the stored data via the connection by making the stored data available through the connection.

14. The apparatus of claim 11 wherein each individual served unit is responsive to every alarm raised at the individual served unit by communicating an indication of the alarm, accompanied by a first request to report the indicated alarm, to a first one of the pair of redundant service units across one of the communication media, is responsive to timely receipt of a success acknowledgment of the first request from the first one of the pair of redundant service units within a first predetermined period of time by communicating the indication of the alarm, accompanied by a second request to not report the indicated alarm, to a second one of the pair of redundant service units across one of the communication media, and is responsive to either receipt of a failure acknowledgment of the first request from the first one of the pair of redundant service units or a failure to receive the success acknowledgment of the first request from the first one of the pair of redundant service units within the first predetermined period of time by communicating the indication of the alarm, accompanied by the first request, to the second one of the pair of redundant service units across one of the communication media, and following communicating the indication of the alarm, accompanied by the first request, to the second one of the pair of redundant service units is responsive to a failure to receive the success acknowledgment of the first request from the second one of the pair of redundant service units within a second predetermined period of time by communicating the indication of the alarm, accompanied by the first request, again at a later time to at least the first one of the pair of redundant service units;

the first and the second one of the pair of redundant service units is each responsive to receipt of the indication of the alarm, accompanied by the first request, from an individual served unit by logging the received indication and reporting the received indication to a destination, communicating the first acknowledgment to the individual served unit in response to a success of the reporting, and communicating the second acknowledgment to the individual served unit in response to a failure of the reporting; and the second one of the pair of redundant service units is responsive to receipt of the indication of the alarm, accompanied by the second request, from the individual served unit for logging the received indication but not reporting the received indication to the destination, and communicating the first acknowledgment to the individual served unit.

15. The apparatus of claim 14 wherein:

each service unit of the pair of redundant service units is responsive to every alarm raised at said each service unit by logging the alarm and if possible reporting the alarm to the destination, is responsive to a success of the reporting by communicating an indication of the alarm, accompanied by the second request, to another one of the pair of redundant service units across one of the communication media, and is responsive to impossibility of the reporting or a failure of the reporting by communicating an indication of the alarm, accompanied by the first request, to said another one of the pair of redundant service units, and is responsive to a failure to receive a success acknowledgment of the first request within a predetermined period of time by subsequently reporting the alarm, if possible, to the destination; and said another one of the pair of redundant service units is responsive to receipt of the indication of the alarm, accompanied by the first request, from said each service unit by logging in the received indication and if possible reporting the received indication to the destination, communicating the success acknowledgment to said each service unit in response to a success of the reporting, and communicating a failure acknowledgment to said each service unit in response to impossibility of the reporting or a failure of the reporting, and is further responsive to receipt of the indication of the alarm, accompanied by the second request, from said each service unit by logging in the received indication but not reporting the received indication to the destination and communicating the success acknowledgment to said each service unit.

16. The apparatus of claim 11 wherein:

a first service unit of the pair of redundant service units responds to receipt of a command from a source other than another service unit of the pair of redundant service units by taking action indicated by the command and determining whether the received command need be communicated to any of the served units and the other service unit of the pair of redundant service units, responds to a determination that the received command need not be communicated by sending a command response to the source, and responds to a determination that the received command need be communicated to selected ones of the served units and the other service unit of the pair of redundant service units by communicating the command individually to the selected ones of the served units and the other service unit of the pair of redundant service units, alternately using a different one of the communication media to communicate a first type of the command to successive ones of the selected ones of the served units and the other service unit of the pair of redundant service units and using both of the communication media to communicate a second type of the command to each one of the selected ones of the served units and the other service unit of the pair of redundant service units;

the other service unit of the pair of redundant service units responds to receipt of a command from the first service unit of the pair of redundant service units by sending a command reply to the first service unit of the pair of redundant service units, taking action indicated by the command, and determining whether the received command need be communicated to any of the served units, and responds to a determination that the received command need be communicated to selected ones of the served units by communicating the command individually to the selected ones of the served units, alternately using a different one of the communication media to communicate of the command to successive ones of the selected units;

each served unit responds to receipt of an individual command from one service unit of the pair of redundant service units by taking action indicated by the command received from the one service unit of the pair of redundant service units, and selectively responds to duplicate receipt of the individual command from both the one and another service unit of the pair of redundant service units by discarding the command received from the other service unit of the pair of redundant service units, and sending a command reply to each service unit of the pair of redundant service units from which the individual command was received;

the other service unit of the pair of redundant service units further being responsive to a failure to receive a command reply from each of the selected served units within a predetermined period of time by subsequently communicating the command again to any of the selected served units from which the command reply was not received within the predetermined period of time; and the first service unit of the pair of redundant service units further being responsive to a failure to receive a command reply from each of the selected ones of the served units and the other service unit of the pair of redundant service units within a predetermined period of time by sending a command response to the source and communicating the command again at a later time to any ones of the selected served units and the other service unit of the pair of redundant service units from which the command reply was not received within the predetermined period of time, and responsive to receipt of the command reply from each of the selected ones of the served units and the other service unit of the pair of redundant service units within the predetermined period of time by sending a command response to the source.

17. A method of operating a redundancy apparatus that comprises a pair of redundant service units, a pair of communication media both connected to each service unit, and a plurality of served units, each connected to both communication media, comprising the steps of:

in response to receipt by the redundancy apparatus of information for the served units, each service unit of the pair of redundant service units communicating the information individually to the served units, each service unit of the pair of redundant service units alternately using a different one of the communication media to communicate the information to successive ones of the served units;

in response to receipt at any served unit of the information from one of the service units of the pair of redundant service units, the served unit using the information received from the one of the service units of the pair of redundant service units; and in response to receipt at the served unit of the information from another of the service units of the pair of redundant service units, the served unit discarding the information received from the other of the service units of the pair of redundant service units.

18. The method of claim 17 in a redundancy apparatus wherein every service unit and every served unit includes a copy of a database of received information, wherein:

the step of each service unit communicating the information comprises the steps of in response to receipt of the information from an information source, a first of the service units storing the received information in its copy of the database and communicating the received information to a second of the service units and to each served unit, and in response to receipt of the information from the first of the service units, the second of the service units storing the received information in its copy of the database and communicating the received information to each served unit; and the step of the served unit using the information comprises the step of
in response to receipt of the information from the one service unit, the served unit storing the received information in its copy of the database.

19. The method of claim 18 wherein:

the step of the served unit using the information comprises the step of
in response to receipt of the information from the one of the service units of the pair of redundant service units, the served unit sending an acknowledgment of the receipt across one of the communication media to the one of the service units of the pair of redundant service units;

the step of the served unit discarding the information comprises the step of
in response to receipt of the information from the other of the service units of the pair of redundant service units, the served unit sending an acknowledgment of the receipt across one of the communication media to the other of the service units of the pair of redundant service units; and the step of each service unit of the pair of redundant service units communicating the information comprises the step of
in response to a failure to timely receive the acknowledgment from every one of the plurality of served units within a predetermined period of time, each service unit of the pair of redundant service units subsequently communicating the information again to any served unit from which the acknowledgment was not timely received.

20. The method of claim 17 further comprising the steps of:

in response to a predetermined event at any individual served unit, the individual served unit communicating data about the predetermined event to a selected one of the pair of redundant service units across one of the communication media;

in response to a failure of a periodic check of its ability to communicate with the selected service unit of the pair of redundant service units, the individual served unit selecting another of the pair of redundant service units; and in response to receipt of the communicated data from the individual served unit, the selected service unit of the pair of redundant service units using the received communicated data.

21. The method of claim 20 wherein:

the step of the selected service unit using the communicated data comprises the steps of
in response to receipt of the communicated data from the individual served unit, the selected service unit storing the received data;

the method of further comprising the steps of
the pair of service units periodically exchanging their copies of the stored received data; and
each service unit storing any exchanged data that it has not previously received; whereby same data exists in both service units.

22. The method of claim 21 in a redundancy apparatus wherein each service unit of the pair of redundant service units comprises a clock, the method further comprising the steps of:

in response to establishment of a connection to said each service unit over a third communication medium, said each service unit sending a response via the connection;

in response to receipt of synchronizing information via the connection, said each service unit synchronizing its clock to the received synchronizing information and sending the synchronizing information to another service unit of the pair of redundant service units over one of the communication media of the pair;

in response to receipt of synchronizing information over one of the communication media of the pair, said another service unit synchronizing its clock to the received synchronizing information; and in response to receipt of a request for the stored data via the connection, said each service unit making the stored data available through the connection.

23. The method of claim 17 further comprising the steps of:

in response to a predetermined event at any individual served unit, the individual served unit communicating a first type of indication of the predetermined event to a first one of the pair of redundant service units across one of the communication media;

in response to a timely receipt of a first type of acknowledgment of the first type of indication from the first one of the pair of redundant service units, the individual served unit communicating a second type of indication of the predetermined event to a second one of the pair of redundant service units across one of the communication media;

in response to either receipt of a second type of acknowledgment of the first type of indication from the first one of the pair of redundant service units or a failure to receive a timely acknowledgment of the first type of indication from the first one of the pair of redundant service units, the individual served unit communicating the first type of indication of the predetermined event to the second one of the pair of redundant service units across one of the communication media; and in response to receipt of the first type of indication from the individual served unit at a receiving one of the pair of redundant service units, the receiving one of the pair of redundant service units logging the received indication and reporting the received indication to a destination;

in response to a success of the reporting, the receiving one of the pair of redundant service units communicating the first type of acknowledgment to the individual served unit;

in response to a failure of the reporting, the receiving one of the pair of redundant service units communicating the second type of acknowledgment to the individual served unit;

in response to receipt of the second type of indication from the individual served unit at the second one of the pair of redundant service units, the second one of the pair of redundant service units logging the received indication but not reporting the received indication to the destination; and in response to logging the received indication, the second one of the pair of redundant service units communicating the first type of acknowledgment to the individual served unit.

24. The method of claim 23 further comprising the steps of:

in response to a prodetermined event at any service unit of the pair of redundant service units, said any service unit logging the predetermined event and reporting the predetermined event to the destination;

in response to a success of the reporting, said any service unit communicating the second type of indication of the predetermined event to another one of the pair of redundant service units across one of the communication media;

in response to a failure of the reporting, said any service unit communicating the first type of indication of the predetermined event to said another one of the pair of redundant service units across one of the communication media;

in response to receipt of the first type of indication from said any service unit, said another one of the pair of redundant service units logging the received indication and reporting the received indication to the destination;

in response to a success of the reporting, said another one of the pair of redundant service units communicating the first type of acknowledgment to said any service unit;

in response to a failure of the reporting, said another one of the pair of redundant service units communicating the second type of acknowledgment to said any service unit;

in response receipt of the second type of indication from said any service unit, said another one of the pair of redundant service units logging the received indication but not reporting the received indication to the destination; and in response to logging the received indication, said another one of the pair of redundant service units communicating the first type of acknowledgment to said any service unit.

25. The method of claim 17 further comprising the steps of in response to receipt of a command from a source other than another service unit of the pair of redundant service units, a first service unit of the pair of redundant service units taking action indicated by the command and communicating the command individually to selected ones of the served units and the other service unit of the pair of redundant service units, alternately using a different one of the communication media to communicate a first type of the command to successive ones of the selected ones of the served units and the other service unit of the pair of redundant service units and using both of the communication media to communicate a second type of the command to each one of the selected ones of the served units and the other service unit of the pair of redundant service units;

in response to receipt of a command from the first service unit of the pair of redundant service units, the other service unit of the pair of redundant service units taking action indicated by the command and determining whether the received command need be communicated to any of the served units;

in response to a determination that the received command need be communicated to selected ones of the served units, the other service unit of the pair of redundant service units communicating the command individually to the selected ones of the served units, alternately using a different one of the communication media to communicate the command to successive ones of the selected served units;

in response to receipt of an individual command from one service unit of the pair of redundant service units at any served unit, the served unit taking action indicated by the command received from the one service unit of the pair of redundant service units; and selectively in response to duplicate receipt of the individual command from another service unit of the pair of redundant service units at the served unit in addition to said receipt of the individual command from the one service unit of the pair of redundant service units, the served unit discarding the command received from the other service unit of the pair of redundant service units.

26. The method of claim 25 wherein the second type of command comprises a check of communications capability.

27. A method of operating a redundancy apparatus that comprises a pair of redundant service units each including a copy of a database, a pair of communication media both connected to each service unit, and a plurality of served units, each connected to both communication media and each including a copy of the database, comprising the steps of:

in response to receipt of information from an information source, a first of the pair of redundant service units storing the received information in its copy of the database and communicating the received information individually to a second of the pair of redundant service units and to each served unit, the first of the pair of redundant service units alternately using a different one of the communication media to communicate the received information to successive ones of the second of the pair of redundant service units and the served units;

in response to receipt of the information from the first of the pair of redundant service units, the second of the pair of redundant service units storing the received information in its copy of the database and sending an acknowledgment of the receipt to the first of the pair of redundant service units, and communicating the received information individually to each served unit, the second of the pair of redundant service units alternately using a different one of the communication media to communicate the received information to successive ones of the served units;

in response to receipt of the information from one of the pair of redundant service units, each served unit storing the information received from the one of the pair of redundant service units in its copy of the database and sending an acknowledgment of the receipt across one of the communication media to the one of the redundant pair of service units;

in response to receipt of the information from another of the pair of redundant service units, each served unit discarding the information received from the other of the pair of redundant service units and sending an acknowledgment of the receipt across one of the media to the other of the pair of redundant service units; and in response to a failure of either service unit of the pair of redundant service units to receive a timely acknowledgment, of receipt of the information that was communicated by said either service unit, from every served unit and service unit of the pair of redundant service units to which the information was communicated by said either service unit within a predetermined period of time, said either service unit subsequently communicating the information again to any served unit and service unit of the pair of redundant service units to which the information was communicated by said either service unit and from which the acknowledgment was not timely received.

28. The method of claim 27 further comprising the steps of:

in response to completion of a task at any individual served unit, the individual served unit communicating data about the task to a selected one of the pair of redundant service units across one of the communication media;

in response to a failure of a periodic check of the individual served unit's ability to communicate with the selected one of the pair of redundant service units, the individual served unit selecting another of the pair of redundant service units;

in response to receipt of the communicated data from an individual served unit at any service unit of the pair of redundant service units, said any service unit of the pair of redundant service units storing the received communicated data; and the pair of redundant service units periodically exchanging copies of the stored received data and each service unit of the pair of redundant service units storing any exchanged data that it has not previously received;

whereby same data is stored in both of the pair of redundant service units.

29. The method of claim 28 in a redundancy apparatus where each service unit of the pair of redundant service units comprises a clock, the method further comprising the steps of:

in response to establishment of a connection to said each service unit over a third communication medium, said each service unit sending a response via the connection;

in response to receipt of synchronizing information via the connection, said each service unit synchronizing its clock to the received synchronizing information and sending the synchronizing information to another service unit of the pair of redundant service units over one of the communication media of the pair;

in response to receipt of synchronizing information over one of the communication media of the pair, said another service unit synchronizing its clock to the received synchronizing information; and in response to receipt of a request for the stored data via the connection, said each service unit making the stored data available through the connection.

30. The method of claim 27 further comprising the steps of:

in response to an alarm raised at any individual served unit, the individual served unit communicating an indication of the alarm, accompanied by a first request to report the indicated alarm, to a first one of the pair of redundant service units across one of the communication media;

in response to timely receipt of a success acknowledgment of the first request from the first one of the pair of redundant service units within a first predetermined period of time, the individual served unit communicating the indication of the alarm, accompanied by a second request to not report the indicated alarm, to a second one of the pair of redundant service units across one of the communication media;

in response to either receipt of a failure acknowledgment of the first request from the first one of the pair of redundant service units or a failure to receive the success acknowledgment of the first request from the first one of the pair of redundant service units within the first predetermined period of time, the individual served unit communicating the indication of the alarm, accompanied by the first request, to the second one of the pair of redundant service units across one of the communication media;

in response to a failure to receive the success acknowledgment of the first request from the second one of the pair of redundant service units within a second predetermined period of time, following communicating the indication of the alarm accompanied by the first request to the second one of the pair of redundant service units, the individual served unit communicating the indication of the alarm, accompanied by the first request, again at a later time to at least the first one of the pair of redundant service units;

in response to receipt by a service unit of the pair of redundant service units of the indication of the alarm, accompanied by the first request, from an individual served unit, the receiving service unit of the pair of redundant service units logging the received indication and reporting the received indication to a destination;

in response to a success of the reporting, the receiving service unit of the pair of redundant service units communicating the first acknowledgment to the individual served unit;

in response to a failure of the reporting, the receiving service unit of the pair of redundant service units communicating the second acknowledgment to the individual served unit;

in response to receipt of the indication of the alarm, accompanied by the second request, from the individual served unit, the second one of the pair of redundant service units logging the received indication but not reporting the received indication to the destination; and in response to logging the received indication, the second one of the pair of redundant service units communicating the first acknowledgment to the individual served unit.

31. The method of claim 30 further comprising the steps of:

in response to an alarm raised at any service unit of the pair of redundant service units, said any service unit logging in the alarm and if possible reporting the alarm to the destination;

in response to a success of the reporting, said any service unit communicating an indication of the alarm, accompanied by the second request, to another one of the pair of redundant service units across one of the communication media;

in response to impossibility of the reporting or a failure of the reporting, said any service unit communicating an indication of the alarm, accompanied by the first request, to said another one of the pair of redundant service units;

in response to a failure to receive a success acknowledgment of the first request within a predetermined period of time, said any service unit subsequently reporting the alarm, if possible, to the destination;

in response to receipt of the indication of the alarm, accompanied by the first request, from said any service unit, said another one of the pair of redundant service units logging the received indication and if possible reporting the received indication to the destination;

in response to a success of the reporting, said another one of the pair of redundant service units communicating the success acknowledgment to said any service unit;

in response to impossibility of the reporting or a failure of the reporting, said another one of the pair of redundant service units communicating a failure acknowledgment to said any service unit;

in response to receipt of the indication of the alarm, accompanied by the second request, from said any service unit, said another one of the pair of redundant service units logging the received indication but not reporting the received indication to the destination; and in response to logging the received indication, said another one of the pair of redundant service units communicating the success acknowledgment to said any service unit.

32. The method of claim 27 further comprising the steps of:

in response to receipt of a command from a source other than another service unit of the pair of redundant service units, a first service unit of the pair of redundant service units taking action indicated by the command and determining whether the received command need be communicated to any of the served units and the other service unit of the pair of redundant service units;

in response to a determination that the received command need not be communicated, the first service unit of the pair of redundant service units sending a command response to the source;

in response to a determination that the received command need be communicated to selected ones of the served units and the other service unit of the pair of redundant service units, the first service unit of the pair of redundant service units communicating the command individually to the selected ones of the served units and the other service unit of the pair of redundant service units, alternately using a different one of the communication media to communicate a first type of the command to successive ones of the selected ones of the served units and the other service unit of the pair of redundant service units and using both of the communication media to communicate a second type of the command to each one of the selected ones of the served units and the other service unit of the pair of redundant service units;

in response to receipt of a command from the first service unit of the pair of redundant service units, the other service unit of the pair of redundant service units sending a command reply to the first service unit of the pair of redundant service units, taking action indicated by the command, and determining whether the received command need be communicated to any of the served units;

in response to a determination that the received command need be communicated to selected ones of the served units, the other service unit of the pair of redundant service units communicating the command individually to the selected ones of the served units, alternately using a different one of the communication media to communicate the command to successive ones of the selected served units;

in response to receipt of a command from a sending service unit of the pair of redundant service units at any served unit, the receiving served unit sending a command reply to the sending service unit of the pair of redundant service units and selectively determining whether the received command had already been received;

in response to a lack of a determination that the command had already been received, the receiving served unit taking action indicated by the received command;

in response to a determination that the command had already been received, the receiving served unit discarding the other received command;

in response to a failure to receive a command reply from each of the selected served units within a predetermined period of time, the other service unit of the pair of redundant service units communicating the command again at a later time to any of the selected served units from which the command reply was not received within the predetermined period of time; and in response to a failure to receive a command reply from each of the selected ones of the served units and the other service unit of the pair of redundant service units within a predetermined period of time, the first service unit of the pair of redundant service units sending a command response to the source and communicating the command again at a later time to any ones of the selected served units and the other service unit of the pair of redundant service units from which the command reply was not received within the predetermined period of time; and in response to receipt of the command reply from each of the selected ones of the served units and the other service unit of the pair of redundant service units within the predetermined period of time, the first service unit of the pair of redundant service units sending a command response to the source.

* * * * *